United States Patent [19]

Harrod et al.

[11] Patent Number: 4,828,232
[45] Date of Patent: May 9, 1989

[54] VEHICLE AIR SUSPENSION STRUT WITH COMPLIANT COVER PLATE ASSEMBLY

[75] Inventors: Edward L. Harrod, Troy, Mich.; Wayne V. Fannin, Xenia; James M. Pees, Dayton, both of Ohio

[73] Assignee: General Motors Corporation, Detroit, Mich.

[21] Appl. No.: 550,795

[22] Filed: Nov. 14, 1983

[51] Int. Cl.$^4$ .............................................. F16F 9/04
[52] U.S. Cl. ............................ 267/64.24; 188/322.12; 267/35; 267/220; 280/692
[58] Field of Search ....................... 188/321.11, 322.12; 267/220, 35, 64.15, 64.19, 64.21, 64.23, 64.24, 64.27, 140.2, 152, 64.12; 280/692

[56] References Cited

U.S. PATENT DOCUMENTS

| | | | |
|---|---|---|---|
| 2,606,630 | 8/1952 | Rossman | 188/284 |
| 3,159,391 | 12/1964 | Wilfert et al. | 267/63 R |
| 4,067,558 | 1/1978 | Keijzer et al. | 267/64.19 X |
| 4,175,770 | 11/1979 | Draisbach et al. | 280/668 |
| 4,200,307 | 4/1980 | Szabo | 280/668 |
| 4,248,454 | 2/1981 | Cotter et al. | 280/668 |
| 4,256,292 | 3/1981 | Sullivan, Jr. et al. | 267/8 R |
| 4,260,176 | 4/1981 | Pacis et al. | 280/692 X |

FOREIGN PATENT DOCUMENTS

| | | | |
|---|---|---|---|
| 80267 | 6/1983 | European Pat. Off. | 267/64.12 |
| 2294869 | 7/1976 | France | 188/322.12 |
| 58-30811 | 2/1983 | Japan | 267/8 R |
| 2084692 | 4/1982 | United Kingdom | 267/64.15 |

Primary Examiner—George E. A. Halvosa
Attorney, Agent, or Firm—Charles R. White

[57] ABSTRACT

Rolling lobe air suspension strut having a specialized compliant cover plate assembly that forms the upper end of the air spring and which provides for absorption of jounce energy. This cover plate assembly provides optimization of isolation characteristics through split paths carried into the body through the isolation cushion in the mount assembly and the isolator portion of the compliant cover plate provided by the elastomer jounce bumper.

3 Claims, 1 Drawing Sheet

VEHICLE AIR SUSPENSION STRUT WITH COMPLIANT COVER PLATE ASSEMBLY

This invention relates to vehicle suspensions and more particularly to an air adjustable suspension strut with a compliant cover plate assembly which forms the upper extremity of the air spring and which transmits air spring suspension and jounce bumper forces to the top mount assembly as the top mount assembly provides a parallel path for the hydraulic forces generated by the strut damper.

Prior to the present invention, various suspension strut designs have incorporated rolling lobe air springs and an associated height control system for vehicle leveling purposes. An illustrative air adjustable strut is shown in U.S. Pat. No. 4,206,907 issued June 10, 1980 to Edward L. Harrod for Suspension Strut With Pneumatic Spring. The strut of this invention is of this general category but incorporates a new and improved compliant cover plate assembly that forms the upper end of the rolling lobe air spring and accommodates strut motions and suspension forces. The compliant cover plate assembly includes an elastomeric jounce bumper at its core which provides improved cushioning of jounce motions. The cover plate assembly further provides parallel paths for air sleeve and jounce bumper forces while hydraulic forces from the hydraulic damper are cushioned by the elastomer of the top mount.

The elastomer jounce bumper of the preferred embodiment of this invention is a generally cylindrical member fixed to the piston rod and interposed between the seal cover mounted jounce bumper plate and the upper mount secured to the vehicle body work. A cylindrical dust tube has its upper end sealingly connected to the jounce bumper. The elastomer sleeve of the air spring is attached in conventional manner to the dust tube and hydraulic damper. With this construction, the jounce bumper provides the upper end of the air spring and deflects as the jounce bumper plate moves into engagement therewith to dissipate jounce energy. The upper portion of the jounce bumper transmits air spring suspension loads to the top mount assembly which contacts the jounce bumper.

It is a feature, object and advantage of this invention to provide a new and improved air spring suspension strut for vehicles having a compliant cover plate assembly including an elastomer jounce bumper which sealingly mounts an air spring to the piston rod and channels ratios of air sleeve forces, jounce bumper forces and hydraulic forces generated in this suspension through two isolation paths in the strut lift mounting system.

Another feature, object and advantage of this invention is to provide a new and improved compliant cover plate assembly for an air adjustable suspension strut which incorporates a jounce bumper that transmits and isolates suspension loads from the hydraulic forces of the strut and which cushions jounce forces and forms a seal for the air spring of the strut.

Another feature, object and advantage of this invention is to provide a new and improved compliant cover plate assembly for an air spring suspension strut that provides a first force path for jounce bumper and air spring forces onto the housing of the body mount assembly and which allows hydraulic forces transmitted by the piston rod of the hydraulic damper to be dissipated by the elastomer of the body mount assembly.

These and other features, objects and advantages of this invention will be more apparent from the following detailed description and drawing in which.

Figures 1, 2:
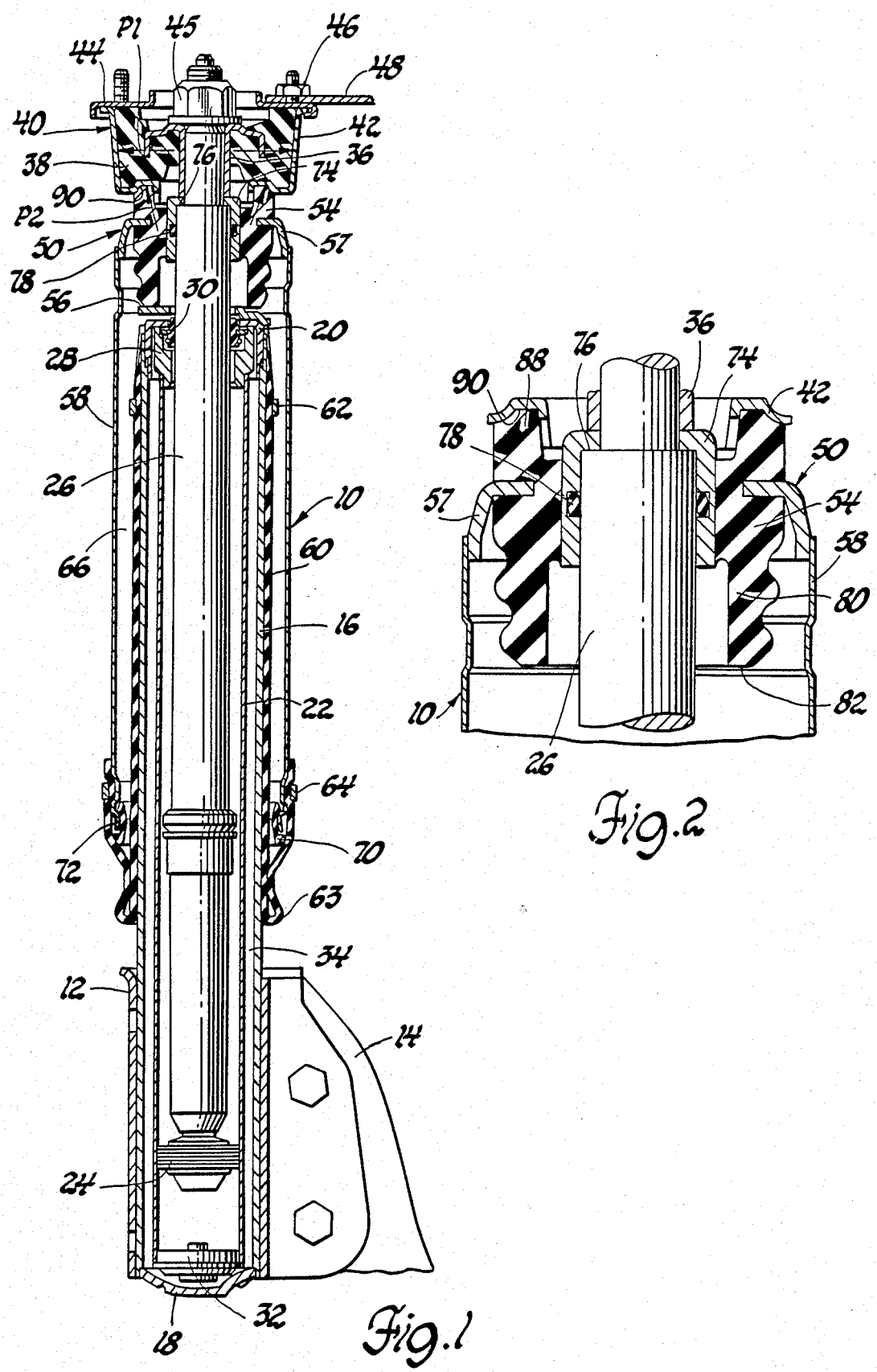
FIG. 1 is a side elevational view partially in cross-section of a suspension strut incorporating the present invention.
FIG. 2 is an enlarged view of a portion of the strut of FIG. 1.

Turning now in greater detail to the drawings, there is shown in FIG. 1 a suspension strut 10 having a bracket 12 at its lower end adapted to be secured to a vehicle road wheel assembly 14 which is only partly illustrated. More particularly, the strut comprises a hydraulic damper with an elongated outer reservoir tube 16 closed by a lower end cap 18 and secured within the cylindrical socket provided by bracket 12. The reservoir tube 16 extends upwardly from the bracket to a terminal end cap or seal cover 20 welded or otherwise secured to the upper end of the reservoir tube. The strut contains an elongated oil-filled cylinder tube 22 spaced inwardly from and concentric with the reservoir tube 16 in which a valved piston 24 is slidably mounted. A piston rod 26 attached at its inner end to the piston 24 extends upwardly therefrom through a rod guide 28 mounted on the upper end of the cylinder tube 22 and held in position by the end cap 20.

An annular elastomer seal 30 is mounted in the rod guide 28 and has annular sealing contact with the piston rod 26 to prevent loss of hydraulic shock absorber oil from the unit as the piston strokes in the cylinder tube during damping operations. A base valve 32 secured to the lower end of the cylinder tube controls the flow of shock absorber oil between the cylinder tube and a fluid reservoir 34 formed between the cylinder tube and the reservoir tube on compression and rebound stroke of the piston for damping spring action. The piston rod 26 extending from the upper end of the damper carries a metallic bushing 36 with an upper flange that is embedded in a torrodial elastomeric isolator cushion 38 of an upper mount assembly 40. This cushion 38 has a low spring rate to dissipate transmission of energy into the vehicle from the piston 24 as it reciprocates in the cylinder tube to damp suspension spring action. A metallic shell or housing 42 and cover plate 44 partially encloses the isolator cushion 38 as shown in FIG. 1. Nut 45 threaded onto the upper end of the piston rod secures the upper mount assembly to the piston rod. Threaded fasteners 46 secure the upper mount assembly 40 to the sheet metal 48 of a mounting tower or other support formed in the body of the vehicle.

A compliant cover plate assembly 50, including a cylindrical jounce bumper 54 of a suitable elastomer material, is secured to an upper end of the piston rod 26 immediately below the upper mount assembly 40. In jounce, this bumper is contacted and deflected by a bumper plate 56 welded or otherwise secured to the top of the end cap 20 of the hydraulic damper. The compliant cover plate assembly also includes a generally cup-shaped connector plate 57 of sheet metal having an inner diameter embedded in the jounce bumper and an outer diameter welded to the upper end of a cylindrical steel dust tube 58. The dust tube extends from upper attachment with the plate 57 down and around the reservoir tube 16 in a conventional manner.

Strut 10 has an air suspension spring provided by a cylindrical elastomer air sleeve 60 having its inner and upper end connected to the upper end of the reservoir tube 16 by a constricted clamping ring 62. From this clamping ring, the sleeve 60 follows downwardly around the outer periphery of the reservoir tube and is reversely curved intermediate the ends thereof to form a rolling lobe 63. From this lobe, the sleeve extends upwardly and around the lower end of the dust tube 58. A second clamping ring 64, similar to clamping ring 62, is employed to secure the sleeve to the lower end of the dust tube in an air tight manner. The pneumatic chamber 66 formed by the dust tube, the reservoir tube, the elastomer air sleeve and the compliant cover plate assembly 50 may be charged with pressurized air or gas to provide a pneumatic spring for vehicle suspension purposes including load leveling. The system for controlling the pressure within the air spring may be based on the system disclosed in U.S. Pat. No. 3,372,919 to G. W. Jackson for Automatic Vehicle Leveling System.

There is improved operation of the pneumatic suspension spring and extended service life of the sleeve 60 with the addition of an air sleeve guide 70 which is releasably attached to the lower end of the dust tube 58. This guide is a resilient wide torrus or ring of plastic material which has a smooth outer surface and low friction engagement with the elastomeric air sleeve 60 to reduce sleeve wear during operation of this strut. The ring-like guide is formed with a centralized external groove 72 which fits into the outwardly flanged lower end of the dust tube as shown in FIG. 1.

The jounce bumper 54 of this invention is bonded at its internal diameter to a generally cylindrical insert or jounce bumper stop 74 of steel which fits over the shoulder 76 provided by the reduced diameter upper end portion of the piston rod 26. This insert or stop contacts the lower end of bushing 36 and has an inner annular groove therein which receives the elastomeric O-ring 78 that forms a static seal which sealingly engages the piston rod 26 to prevent air leakage past the jounce bumper. Jounce bumper 54 has a downwardly extending skirt 80 with convolutions that terminate in a lower annular end surface 82. On jounce, the bumper 80 is deflected as the contact plate 56 engages end surface 82 and moves toward the jounce bumper stop 74. Jounce movement is further retarded by the engagement of the end of the stop 74 with plate 56. In addition to providing a jounce bumper function, the cover plate assembly 50 provides the compliant upper end and seal for the air spring provided by the pressurized pneumatic chamber 66. The collar-like upper end 88 of the jounce bumper assembly 54 has an end surface that seats against the lower surface 90 of the metallic shell 42 of the upper mount assembly 40.

With the preferred construction, the piston rod is connected to the isolator cushion 38 so that hydraulic forces generated by the piston as it strokes in the cylinder tube of the strut will be primarily routed to and dissipated by isolator cushion 38 which preferably has a lower spring rate than that of the jounce bumper 54. This substantially reduces the transmittal of road shocks by the piston rod to the passenger compartment of the vehicle. This routing of hydraulic forces is diagrammatically illustrated by path P1.

The suspension spring loads from the air sleeve will be carried through the higher spring rate jounce bumper 54 to the shell-like housing 42 of the upper mount assembly. This force path is shown as path P2 in FIG. 1. It will be appreciated that these two load paths are in parallel with one another and spring rates can be selected to give optimum ride performance with hydraulic forces being damped by the lower spring rate of the isolator cushion. In addition, the jounce bumper assembly provides a compliant cover plate which accommodates the action of the air suspension spring to effectively provide the lifting force needed for assist of main suspension springs for load leveling purposes and which allows the strut to move in a normal manner without adversely affecting the jounce bumper assembly during operation.

While a preferred embodiment of the invention has been shown and described, other embodiments will become apparent to those skilled in the art. Accordingly, the scope of this invention is set forth in the following claims.

The embodiments of the invention in which an exclusive property or privilege is claimed are defined as follows:

1. An air adjustable suspension strut for a vehicle having a hydraulic damper with a reciprocably movable piston operatively mounted in the cylinder tube thereof and having a piston rod extending through an upper end cap into connection with an elastomer isolator cushion of an upper mount, said upper mount having a metallic housing secured to body work of the vehicle and encasing said isolator cushion, said strut having a dust tube and an elastomer air sleeve operatively attached thereto and pressurized with air providing a load supporting suspension spring, the improvement comprising a compliant cover plate assembly including a generally cylindrical jounce bumper of resilient rubber-like material disposed around an upper end portion of said piston rod and operatively connected thereto below said upper mount, an end connector plate for said dust tube centrally connected to said jounce bumper and forming the upper extremity of said suspension spring, said jounce bumper having an upper section directly contacting said housing of said upper mount so that air spring suspension loads are carried by said jounce bumper and transmitted to said housing, said jounce bumper further having a lower section for deflection in response to direct contact with the upper end cap of said hydraulic damper to cushion and limit the telescopic movement of said piston rod into said cylinder tube.

2. A pneumatic suspension unit for a vehicle having a hydraulic damper with a cylinder tube containing a hydraulic damping fluid therein, a piston mounted for reciprocating movement in said cylinder tube, a piston rod attached to said piston and extending axially through one end of said cylinder tube, an outer tube disposed around said cylinder tube and defining a fluid reservoir, a cylindrical dust shield, a compliant cover plate for said unit, said cover plate including jounce bumper assembly means operatively connecting said dust shield to said piston rod so that said dust shield extends outwardly of and around a portion of said outer tube; a cylindrical air sleeve of elastomeric material having a first end operatively connected to said outer tube and a second end operatively connected to said dust shield to form an air-adjustable lift spring; said air sleeve extending alongside of said outer tube and reversely curved between said first and second ends thereof; said jounce bumper assembly means comprising a cylindrical body of elastomeric material with upper and lower ends and a connector plate extending outwardly from said cylindrical body and having an airtight connection at its outer diameter with said dust shield, said cylindrical body being secured to and mounted in an air-tight manner on said piston rod so that said compliant cover plate assembly forms the upper end of said air adjustable lift spring, an upper mount assembly for operatively connecting said jounce bumper assembly means to supporting structure of the vehicle, said upper mount assembly comprising an annular isolator cushion operatively connected to the upper end of said piston rod and a metallic housing encompassing said cushion and secured to the supporting structure, said housing having a lower surface for direct contact with upper end of said body to receive loads from said lift spring.

3. The suspension unit of claim 2, wherein said jounce bumper assembly means and said upper mount provide two separate isolation paths through which lift spring forces and jounce forces are respectively channeled.

* * * * *